US012564859B2

(12) United States Patent
Vuong et al.

(10) Patent No.: US 12,564,859 B2
(45) Date of Patent: Mar. 3, 2026

(54) MOTOR-FREE METHOD TO 3D MONOLAYER COATINGS

(71) Applicant: THE REGENTS OF THE UNIVERSITY OF CALIFORNIA, Oakland, CA (US)

(72) Inventors: Luat Thanh Vuong, Riverside, CA (US); Sophie Weiss, Riverside, CA (US); Frank Rodriguez, Riverside, CA (US); Ji Feng, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/599,941

(22) Filed: Mar. 8, 2024

(65) Prior Publication Data

US 2024/0299975 A1    Sep. 12, 2024

Related U.S. Application Data

(60) Provisional application No. 63/450,776, filed on Mar. 8, 2023.

(51) Int. Cl.
| | |
|---|---|
| *B05D 1/20* | (2006.01) |
| *C09D 5/02* | (2006.01) |
| *C09D 7/20* | (2018.01) |
| *C09D 7/40* | (2018.01) |
| *C09D 7/61* | (2018.01) |
| *C09D 125/06* | (2006.01) |

(52) U.S. Cl.
CPC ............. *B05D 1/204* (2013.01); *B05D 1/206* (2013.01); *C09D 5/02* (2013.01); *C09D 7/20* (2018.01); *C09D 7/61* (2018.01); *C09D 7/67* (2018.01); *C09D 7/68* (2018.01); *C09D 7/70* (2018.01); *C09D 125/06* (2013.01)

(58) Field of Classification Search
CPC .......... B05D 1/204; B05D 1/206; C09D 7/61; C09D 7/20; C09D 7/67; C09D 7/68; C09D 7/70; C09D 5/02; C09D 125/06
See application file for complete search history.

(56) References Cited

U.S. PATENT DOCUMENTS 5,143,745 A * 9/1992 Maganas ................ B05D 1/206
427/430.1

OTHER PUBLICATIONS

Agarwal et al. "Deposition of Langmuir monolayers using conical trough" Thin Solid Films vols. 327-329 (1998) 9-13. (Year: 1998).*

(Continued)

*Primary Examiner* — Robert S Walters, Jr.
(74) *Attorney, Agent, or Firm* — Buchanan Ingersoll & Rooney PC

(57) ABSTRACT

A method is disclosed of three-dimensional (3D) free-form printing for coating free-form objects, the method including: arranging a free-form object in a Langmuir-Blodgett (LB) trough filed with a liquid, the LB trough designed based on a shape of the free-form object; arranging an LB film comprising a plurality of colloidal nanospheres on a surface of the liquid within the LB trough; and draining the liquid from the LB trough to form a self-assemble film of the colloidal nanoparticles on a surface of the free-form object.

15 Claims, 6 Drawing Sheets

(56) References Cited

OTHER PUBLICATIONS

De Barros et al. "Incorporation of gold nanoparticles into Langmuir-Blodgett films of polyaniline and montmorillonite for enhanced detection of metallic ions" Sensors and Actuators B 236 (2016) 408-417. (Year: 2016).*

Botcha et al. "A 'modified' Langmuir-Blodgett technique for transfer of graphene oxide monolayer sheets on solid substrates" Mater. Res. Express 3 035002 2016. (Year: 2016).*

Sirotkin et al. "Macroscopic Ordering of Polystyrene Carboxylate-Modified Nanospheres Self-Assembled at the Water-Air Interface" Langmuir vol. 26 (13) 10677-10683. (Year: 2010).*

Thangamuthu et al. "Reliable Langmuir Blodgett colloidal masks for large area nanostructure realization" Thin Solid Films 709 (2020) 138195. (Year: 2020).*

Arai, et al., "On the Convective Self-Assembly of Colloidal Particles in Nanofluid Based on in Situ Measurements of Interaction Forces", Langmuir, vol. 35, Aug. 8, 2019, pp. 11533-11541.

Cai, et al., "From Colloidal Particles to Photonic Crystals: Advances in Self-Assembly and Their Emerging Applications", Chemical Society Reviews, vol. 50, 2021, 92 pages.

Fan, et al., "A Smart Large-Scale Explosive-responsive Amorphous Photonic Crystal Sensor Based on Color Analysis Method", Chemical Engineering Journal, vol. 446, Part 5, Article No. 136450, Oct. 15, 2022, pp. 1-8.

Feng, et al., "Insect-inspired Nanofibrous Polyaniline Multiscale Films for Hybrid Polarimetric Imaging With Scattered Light", Nanoscale Horizons, vol. 7, 2022, pp. 319-327.

Grunfeld, F., "A Modular Multifunctional Langmuir-Blodgett Trough", Review of Scientific Instruments, vol. 64, Feb. 1, 1993, pp. 548-555.

Ivanov, et al., "Aspects of Langmuir-Blodgett Trough Design: Computerization, Surface Pressure Measurement, Unevenness of Motion, Generated Vibrations", Thin Solid Films, vol. 210-211, Part 1, Apr. 15, 1992, pp. 13-15.

Kato, et al., "Development of a Precisely Temperature-Programmable Langmuir Trough for Measuring Properties of Insoluble Monolayers at the Water Surface as Functions of Temperature", Japanese Journal of Applied Physics, vol. 34, No. 7B, 1995, pp. 1-3.

Kohoutek, et al., "Controlled Self-Assembly of Langmuir-Blodgett Colloidal Crystal Films of Monodispersed Silica Particles on Non-planar Substrates", Colloids and Surfaces A: Physicochemical and Engineering Aspects, vol. 593, Article No. 124625, May 20, 2020, pp. 1-8.

Li, et al., "Colloidal Self-Assembly Approaches to Smart Nanostructured Materials", Chemical Reviews, vol. 122, No. 5, Nov. 8, 2021, pp. 4976-5067.

Li, et al., "Large-Area Nanoparticle Films by Continuous Automated Langmuir-Blodgett Assembly and Deposition", Langmuir, vol. 32, No. 5, Jan. 7, 2016, pp. 1220-1226.

Liang, et al., "Roll-to-Roll Fabrication of Touch-Responsive Cellulose Photonic Laminates", Nature Communications, vol. 9, Article No. 4632, 2018, pp. 1-7.

Miller, et al., "A New Type of Langmuir-Blodgett Trough", Journal of Physics E: Scientific Instruments, vol. 21, No. 2, 1988, pp. 1-2.

Oliveira, et al., "The Past and the Future of Langmuir and Langmuir-Blodgett Films", Chemical Reviews, vol. 122, No. 6, Mar. 23, 2022, pp. 6459-6513.

Parchine, et al., "Large Area 2D and 3D Colloidal Photonic Crystals Fabricated by a Roll-to-Roll Langmuir-Blodgett Method", Langmuir, vol. 32, No. 23, Jun. 14, 2016, pp. 5862-5869.

Proscia, et al., "Control of Photo-induced Voltages in Plasmonic Crystals via Spin-Orbit Interactions", Optics Express, vol. 24, No. 10, May 16, 2016, pp. 10402-10411.

Shimmin, et al., "Slow Vertical Deposition of Colloidal Crystals: A Langmuir-Blodgett Process?", Langmuir, vol. 22, No. 15, Jul. 18, 2006, pp. 6507-6513.

Stewart, et al., "Self-Assembly Around Curved Surfaces", Proceedings of SPIE, Photonics: Design, Technology, and Packaging III, vol. 6801, 2008, pp. 1-9.

Xu, et al., "Continuous Langmuir-Blodgett Deposition and Transfer by Controlled Edge-to-Edge Assembly of Floating 2D Materials", Langmuir, vol. 35, No. 1, Dec. 12, 2018, pp. 51-59.

Ye, et al., "Gravity-Assisted Convective Assembly of Centimeter-Sized Uniform Two-Dimensional Colloidal Crystals", Langmuir, vol. 29, No. 6, Feb. 12, 2013, pp. 1796-1801.

Zaky, et al., "Novel Smart Window Using Photonic Crystal for Energy Saving", Scientific Reports, vol. 12, Article No. 10104, 2022, 9 pages.

Zasadzinski, et al., "Langmuir-Blodgett Films", Science, vol. 263, No. 5154, Mar. 25, 1994, pp. 1726-1733 (9 pages).

Zhang, et al., "Flexible Mechanochromic Photonic Crystals: Routes to Visual Sensors and Their Mechanical Properties", Journal of Materials Chemistry C, vol. 6, 2018, pp. 3182-3199.

Langmuir & Langmuir Blodgett_Measurements, "The Langmuir (L), Langmuir-Blodgett (LB) and Langmuir-Schaefer (LS) techniques enable fabrication and characterization of single molecule thick films with control over the packing density of molecules. LB technique is a key method in depositing nanoparticles with controlled packing density.",https://www.biolinscientific.com/measurements/langmuir-and-langmuir-blodgett. Mar. 25, 2024(12 pages).

* cited by examiner

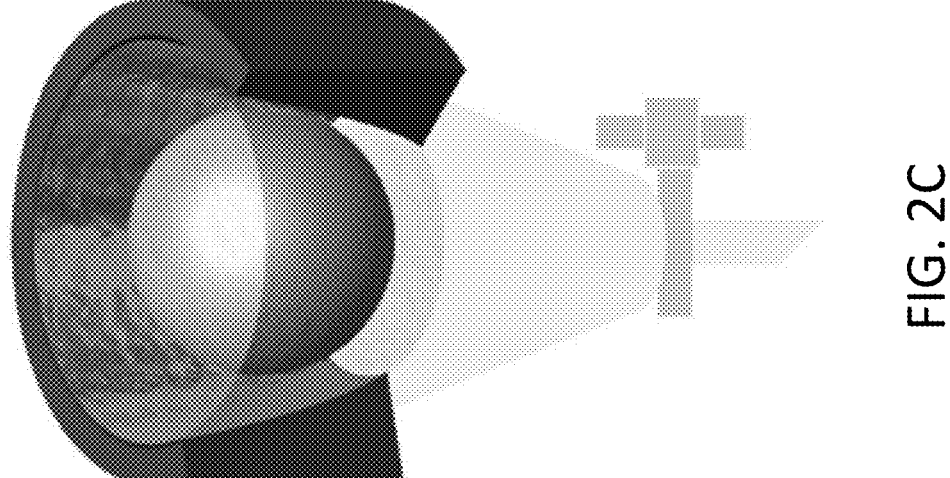
FIG. 2A
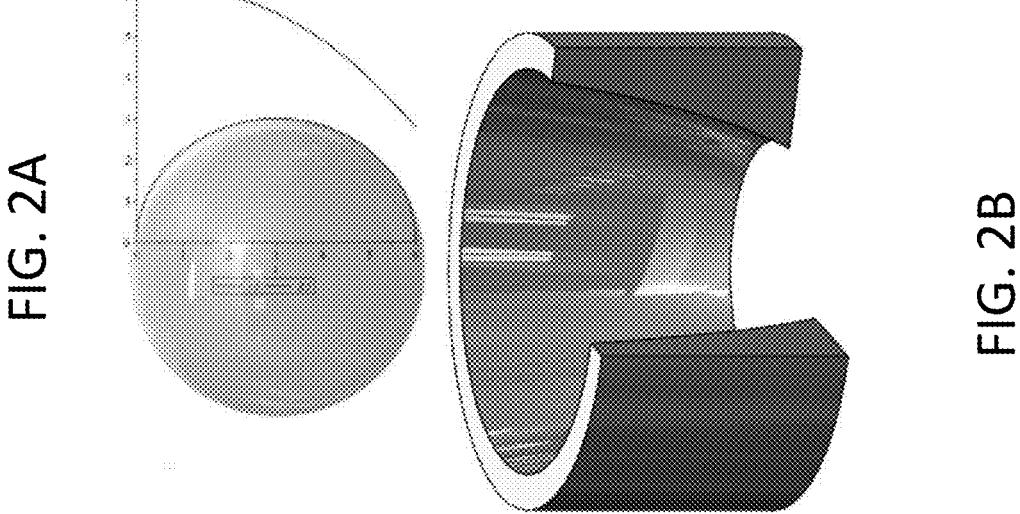
FIG. 2C
FIG. 2B

MOTOR-FREE METHOD TO 3D MONOLAYER COATINGS

CROSS REFERENCE TO RELATED APPLICATIONS

This application claims the benefit of U.S. Provisional Application No. 63/450,776, filed Mar. 8, 2023, which is incorporated by reference in its entirety.

STATEMENT OF FEDERALLY SPONSORED RESEARCH

This invention was made with government support under contract 1921034 awarded by the National Science Foundation, and under contract D19AP00036 awarded by the Defense Advanced Research Projects Agency. The government has certain rights in the invention.

TECHNICAL FIELD

This invention relates to methods of 3D free-form printing strategies for coating arbitrary free-form objects.

BACKGROUND

Langmuir-Blodgett (LB) close-packed monolayers are produced at the air-liquid interface. The challenge of depositing such a coating onto another object surface is that the object must be pulled out at a smooth rate while the film is constantly compressed (so that it remains close-packed). In 1988, a scissor-based trough was designed but did not gain traction.

Most irregularities in the deposited film come from two types of movement of the barriers: (1) vibration, the longitudinal bobbing of the barriers on the water's surface creating capillary waves and/or collapse of the film, and (2) uneven lateral motion of the barriers causing striations of the film as it collects on the substrate. However, focus on previous LB improvements have been on using the typical moving barrier design to expand the area and dimensions of the films.

To drastically increase the area of the film, one can employ the roll-to-roll method. This takes the sliding barrier trough but replaces one barrier with a rolling poly(ethylene terephthalate) (PET) substrate that collects the LB film pushed by the remaining barrier. The covered PET film can then be adhered to any surface expanding the domain of "coatable" objects from two-dimensional (2D) to three-dimensional (3D), with an area up to 340 cm$^2$.

Improving upon this method, some replaced the single barrier in roll-to-roll with the continuous deposing of the colloidal material. Here compaction of the colloidal film happens purely from solvent driven densification, that is, the compaction of spheres on the water-air interface through the evaporation of a volatile solvent, instead of mechanical pressure of the barrier. This increased the coverage capability drastically, up to 400 m$^2$, but still relied on PET substrates.

Recently, a method was developed to deposit LB films directly onto 2D and 3D (as in curved or wavy) substrates. However, this design went back to the original sliding barrier trough with all the potential for film inconsistencies that barrier instabilities bring.

Langmuir Blodgett troughs can cost approximately USD 70,000 and typically they include smart tension and smooth motor control. To deposit multiple layers can be a complicated task, and starting prices for those begin around approximately USD 100,000. The present invention introduces a new idea to overcome at least some of the current problems and issues.

SUMMARY

Langmuir-Blodgett films are monolayer self-assembled film of colloidal photonic crystal films useful for sensing in a variety of environments, optical computing, anti-reflection or general coatings, membrane development, mask patterning for etching. In addition, LB films can also produce 2D materials, which can be used for quantum applications, and 3D printing companies working on additive manufacturing with LB films. Langmuir-Blodgett (LB) troughs are typically used to deposit monolayer films onto substrates. However, previous LB troughs designs have yet to eliminate the capillary waves and striations on deposited films caused by the vibration of motorized barriers. The current dampener for the discrete motor motion is external vibration tables, and LB troughs are typically held in extensive clean rooms. In accordance with an embodiment, the disclosed bench top LB trough design condenses the film without motorized barriers, via the trough's geometry and water drainage.

In accordance with an exemplary embodiment, a method and mathematical model is disclosed for a 3D free-form printing strategy for coating arbitrary free-form objects. The method is superior, for example, to the USD 70,000 instruments available on the market at a fraction of the cost and because no motorized parts are needed, the method is capable of producing more reliable coatings.

The LB trough design deposits self-assembled colloidal films directly onto a range of complex 3D substrates without PET films. In accordance with an embodiment, solvent driven densification can be used without continuous, for example, potentially wasteful, deposition of colloidal nanospheres, and one can continually condense the film mechanically without the longitudinal or lateral instability of motorized barriers. In accordance with an embodiment, the films can be made on a bench, without a clean room, for example, on a cylindrical jar, spherical bulb, and spiral compressor tubes.

In accordance with an embodiment, glass objects are submerged in a water filled hemisphere-shaped trough, a layer of 2-micron polystyrene (PS) nanosphere beads are deposited on the water-air interface, and the trough is drained through a bottom drip.

In accordance with another embodiment, a hydrophobic basin is 3D printed and water is allowed to drip through the bottom of the basin.

In accordance with a further embodiment, there are no motorized parts. An important part of the invention involves: (1) understanding of the hydrophobic and hydrophilic interactions of the basin and object, which dictate the deposition; (2) the mathematical derivation of the ideal basin shape; (3) the ability to 3D print objects (in this case, the basins) based on analytic relations pre-computed; and (4) the ability to potentially analyze and numerically calculate 3D displacements a priori and input that into 3D printing software, which enables the 3D freeform coating of objects with arbitrary shapes.

In accordance with an embodiment, a method of three-dimensional (3D) free-form printing for coating free-form objects, the method comprising: arranging a free-form object in a Langmuir-Blodgett (LB) trough filed with a liquid, the LB trough designed based on a shape of the free-form object; arranging an LB film comprising a plurality of colloidal nanospheres on a surface of the liquid within the LB trough; and draining the liquid from the LB trough to form a self-assemble film of the colloidal nanoparticles on a surface of the free-form object.

In accordance with another embodiment, a Langmuir-Blodgett (LB) trough, the LB trough comprising: a drainage basin having a radius $R'(z)=r(z)+R(z)$, and wherein $r(z)$ is a radius of a free-form object to be coated and $R(z)$ is a radial distance between the free-form object to be coated and the drainage basin.

BRIEF DESCRIPTION OF THE DRAWINGS

FIGS. 2A-2C are illustrations of a process of customizing the drainage basin for random shapes, wherein FIG. 2A is a basin geometry is calculated so that the distance of the object's edge to the wall of the bowl is always decreasing as the water drains and the polystyrene (PS) is deposited onto the object; FIG. 2B is a basin generated in SolidWorks for 3D printing (here it is shown with a quarter of the basin cut out); and FIG. 2C is a basin position with respect to the object is fixed as the water with monolayer is drained, and wherein the an open base, the basin is placed above a funnel with flow-control valve.

FIGS. 5A-5D are PS coatings on different glass objects, and wherein FIG. 5A is a jar (4.2-cm diameter, 2.0-cm height) illuminated from LED light from above and inside of the jar; FIG. 5B is a bulb (3.0-cm diameter, 2.2-cm height) illuminated with background fluorescent lights; and FIGS. 5C and 5D are compressor tubes (5.82-mm diameter, 19.47-cm swirl diameter, 35.17-mm height, 2.5-mm gap between tubes), illuminated by the flash of the camera.

DETAILED DESCRIPTION

Figures 1A, 1B:
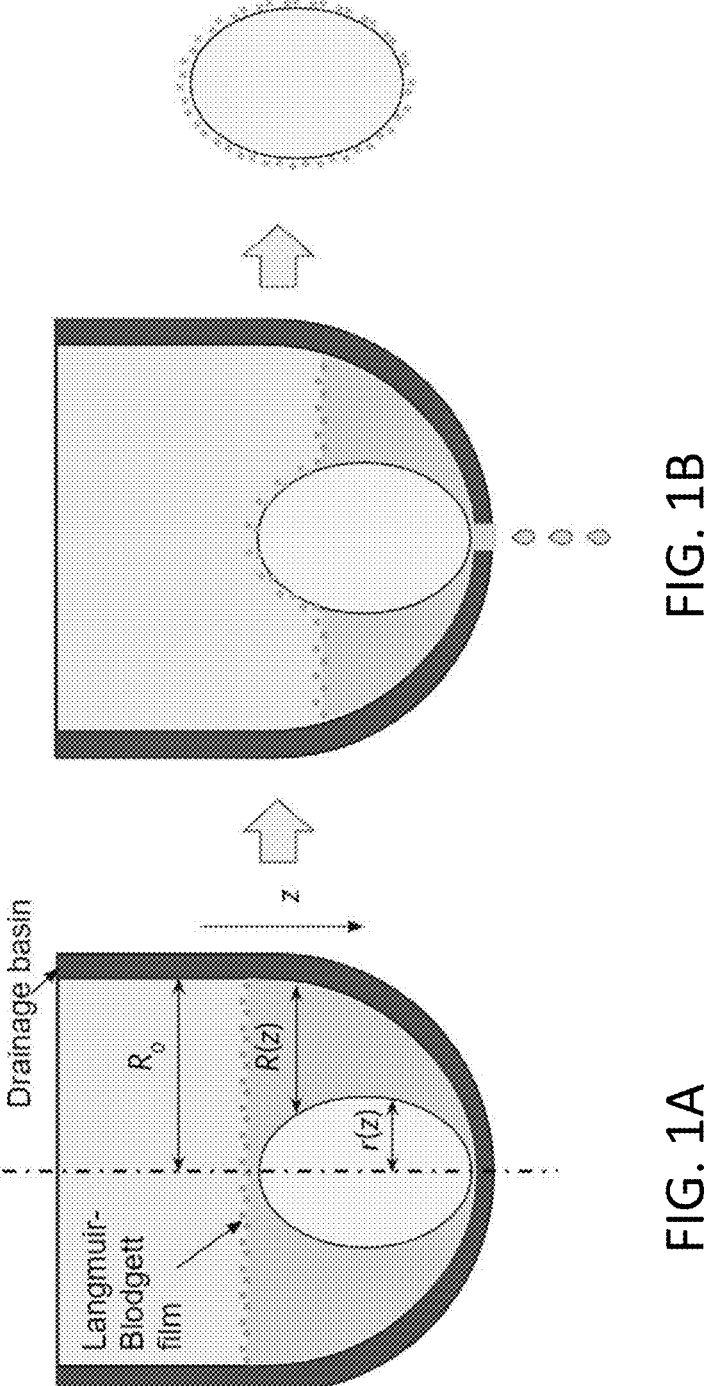
FIG. 1A is an illustration of parameters for drainage basin design. The radius of the drainage basin can be easily calculated based on the average object radius $r(z)$. The basin shown has an initial basin radius $R_0$ that minimizes the amount of unused surface material that is lost in the procedure.
FIG. 1B is an illustration of the process where the object is coated as the liquid drains, and wherein the film is compressed by the basin shape.
Figures 3A, 3B, 3C, 3D:
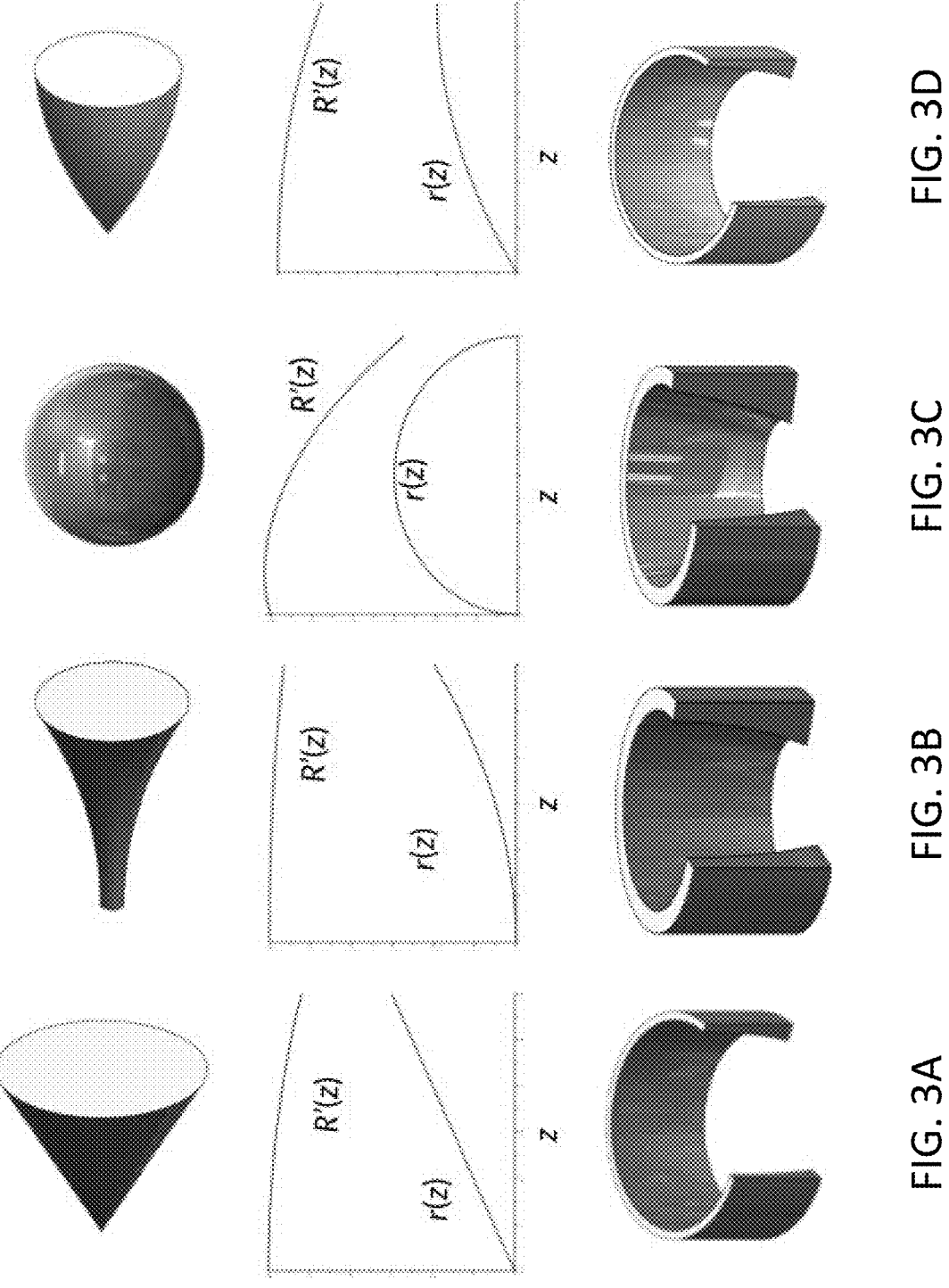
FIGS. 3A-3D are illustrations of analytic functions for drainage basin radius $R'(z)$ of the given $r(z)$ for axicon (FIG. 3A), upwards flaring parabola (FIG. 3B), sphere (FIG. 3C), and parabolic cone (FIG. 3D). Above and below are images of equation-rendered 3D models for the object and basin (with a quarter cut-out to illustrate the shape or $R'(z)$). In these drawings, $R_0$ is constant and chosen so that the basin bottom is not closed. As a result, some colloidal solution will not be used in the coating process. This basin design would be modular and rest on a separate funnel and flow-control valve system as shown in FIG. 2C.

Set forth below with reference to the accompanying drawings is a detailed description of embodiments of methods of 3D free-form printing strategies for coating arbitrary free-form objects. Note that since embodiments described below are preferred specific examples of the present disclosure, although various technically preferable limitations are given, the scope of the present disclosure is not limited to the embodiments unless otherwise specified in the following descriptions.

Langmuir-Blodgett (LB) troughs provide an excellent system to deposit monolayer films onto flat and curved substrates. However, most trough designs use motorized barriers to compact the film, and it is difficult to fully eliminate the capillary waves and striations on deposited films caused by motorized barriers. Here, an inexpensive design is presented for a benchtop LB trough that compresses the film without motorized barriers; instead, it is the trough's geometry that compresses the film in a drainage basin. In accordance with an embodiment, this method is demonstrated with a 3D printed drainage basin and with self-assembled polystyrene (PS) colloidal films on a range of 3D glass substrates that include, for example, a jar, a bulb, and a compressor tube. A mathematical formalism is provided to coat 3D objects with arbitrary size and shape, for example, especially with facile 3D printing, and wherein the concept may be extended in a relatively inexpensive and modular approach.

Introduction

There remains significant interest in the solution-processed deposition of monolayer films, including photonic crystal structures for smart sensing. The inverse structures that are produced via the directed and templated assembly around such films also exhibit a range of intriguing light-matter interactions. Photonic crystal films composed of colloids are often produced via the transfer of self-assembled films at the gas-liquid interface, well-known as Langmuir-Blodgett (LB) films. LB troughs provide an excellent way to deposit monolayer films onto substrates and generally involve an external barrier that continually compresses or compacts the interfacial film as the film is removed to a substrate. A variety of trough designs have been proposed in previous decades, however LB trough designs have yet to fully eliminate the capillary waves and striations on deposited films caused by the vibration of motorized stages. Irregularities in the deposited film are associated with two types of movement of the barriers: (1) the longitudinal bobbing of the barriers on the water's surface create capillary waves and/or collapse of the film, and (2) the uneven lateral motion of the barriers cause striations of the film as it collects on the substrate.

Significant research on LB troughs have often focused on scaling production, for example, using a moving barrier design to increase the total surface area of the film deposition in roll-to-roll methods and incorporating convective assembly, whereby the compaction of the colloidal film occurs via solvent-driven densification, i.e., a combination of contact-line pinning and evaporation of a volatile solvent. The convective assembly of these layers have been studied along with the effect of temperature control and gravity (i.e., angle of the surface), and a robotic arm with feedback may even be employed to produce precise structures. The deposition of LB films directly onto 2D and 3D (as in curved or wavy) substrates with a commercial LB trough with a sliding barrier are known. Commercial systems can provide smooth, precisely controlled, and vibration-free film deposition and motor-vibration dampening for 2D and 3D substrates, however these commercial systems are generally expensive.

Here, a "poor-man's" LB trough design is disclosed and demonstrated that deposits close-packed colloidal films directly onto a range of complex-shaped 3D substrates. A solvent-driven densification is employed without the need for a continuous deposition of colloidal nanospheres in a promising vertical drainage geometry. Moreover, the method continually condenses the film mechanically without the need for motorized barriers. Instead, the films are compacted by the geometry of a 3D-printed drainage basin. A mathematical formalism is provided to coat 3D objects with arbitrary size and shape to show that this approach may be extended in a relatively inexpensive and modular approach. As proof-of-concept, LB films composed of 2-μm diameter polystyrene beads drained through a hemispherical trough with continuous draining were demonstrated. In accordance with an embodiment, the films are made without a vibration-stabilized bench and deposit close-packed films, for example, on a cylindrical jar, spherical bulb, and spiral compressor tubes. The results indicate curvature-based opportunities to study the role of defects and voids in self-assembled LB films: while the crystallinity of the colloidal layers is reduced on curved substrates, desirable close-packed monolayer structures can be achieved. In accordance with an embodiment, the method will enable a variety of educational opportunities and practical applications.

In accordance with an exemplary embodiment, a method is disclosed that generates monolayer polycrystalline nanoparticle assembly on 3D objects with relatively flat and highly curved surfaces. The curvature of the object is in the range of add value of curvatures.

In accordance with an embodiment, the method can be used for carboxylic acid groups (—COOH) modified polystyrene (PS) nanospheres with sizes from 250 nm to 2 μm. The nanospheres, can be, for example, nanospheres purchased from Bangs Laboratories, Inc. The original nanosphere dispersion contains small amount of Tween 20 or sodium dodecyl sulfate as surfactants. The nanospheres are washed to remove these chemicals (i.e., the small amount of Tween 20 and sodium dodecyl). Carboxylic acid surface modification prevents particles from aggregation and is necessary for ordered assembly. DLVO theory shows that the electrostatic repulsion between charged spheres prevents the particles from aggregation:

$$\Phi_{total} = \Phi_{attractive} + \Phi_{repulsive} = -Ar/(12\pi d) + 2\pi\varepsilon_0\varepsilon_r r\xi^2 \exp(-\kappa d) \qquad (50)$$

where A, d, r, $\varepsilon_0$, $\varepsilon_r$, $\zeta$, and $\kappa^{-1}$ are denoted as the Hamaker constant, the particle separation, radius of the particles, the permittivity of the vacuum, relative permittivity, the zeta potential, and the Debye length, respectively. The PS nanospheres can be dispersed in a mixture, for example, of water/ethanol=1:1 volume ratio. The concentration of solid can be, for example, 5 wt %.

The PS nanoparticles can be injected via a syringe. The needle of the syringe is positioned close to the air-water interface, forming a meniscus that helps particles move along it and helps prevent the particles from sinking. A syringe pump can be used to control the injection rate of the PS nanoparticles into the drainage basin of the LB trough. The injection rate can be, for example, 0.1 ml/min to 0.3 ml/min. A high injection rate, for example, greater than 0.3 ml/min can result in amorphous assembly. The method can be carried out at room temperature.

The method, for example, can be applicable for hydrophilic nanoparticles by replacing the solvent with butanol. Butanol is less soluble in water compared with ethanol, which prevents the particles from sinking to the water phase. Examples of hydrophilic nanoparticles include silica nanoparticles, gold, and silver nanoparticles.

In accordance with an embodiment, the method can be used to coat PS nanospheres on different materials including glass, silicon wafer, indium tin oxide coated substrate, quartz, polyethylene terephthalate (PET) and polydimethylsiloxane (PDMS).

Mathematical Design of the Drainage Basin

In accordance with an embodiment, a method is disclosed where the geometry of the drainage basin is designed to compress the LB film. The basin geometry is drawn as radially symmetric for ease of illustration in this work. In FIGS. 1A and 1B, the analytic geometry of the drainage basin are shown with radius R'(z)=r(z)+R(z), where r(z) is the radius of the object to be coated and R(z) is the radial distance between the object and the basin.

In accordance with an embodiment, the basin is designed so that the change in the surface area of the film is the change in the surface coating. That is, if r(z) is the radius of the object as a function of z, then the surface area of the coating at z for thickness dz is also the change in the film area in the cup:

$$\frac{dSA(z)}{dz} = 2\pi r(z) \qquad (1)$$

If R(z) is the inner radius of the drainage basin as a function of z, then the area of the film layer at a location z is:

$$A(z) = \pi[r(z) + R(z)]^2 - \pi[r(z)]^2 \qquad (2)$$

And the change in the surface area of the object is the derivative of that written above:

$$\frac{d[A(z)]}{dz} = 2\pi[r(z) + R(z)]\left[\frac{dr}{dz} + \frac{dR}{dz}\right] - 2\pi r(z)\frac{dr}{dz} \qquad (3)$$

Thus, the change in object surface area would be equal to the negative change in cup area. Let R'=r+R. Then, $$-r(z)\left(1 - \frac{dr}{dz}\right) = R'(z)\frac{dR'}{dz} \qquad (4)$$

If one integrates both sides $$-\int r(z)dz + \frac{r(z)^2}{2} = \frac{R'(z)^2}{2} + C \qquad (5)$$

Then one will have the condition that $R_0$=R(z=0). This yields the nice result:

7

$$R'(z) = \sqrt{R_0^2 - 2\int_0^z r(z')dz' + r(z)^2} \qquad (6)$$

If the colloid solution is minimized in the no-waste scenario, then for an object of length $z_0$, $R'(z_0)=0$, and $$R_0 = \sqrt{2\int_0^{z_0} r(z)dz} \qquad (7)$$

Figure 4:
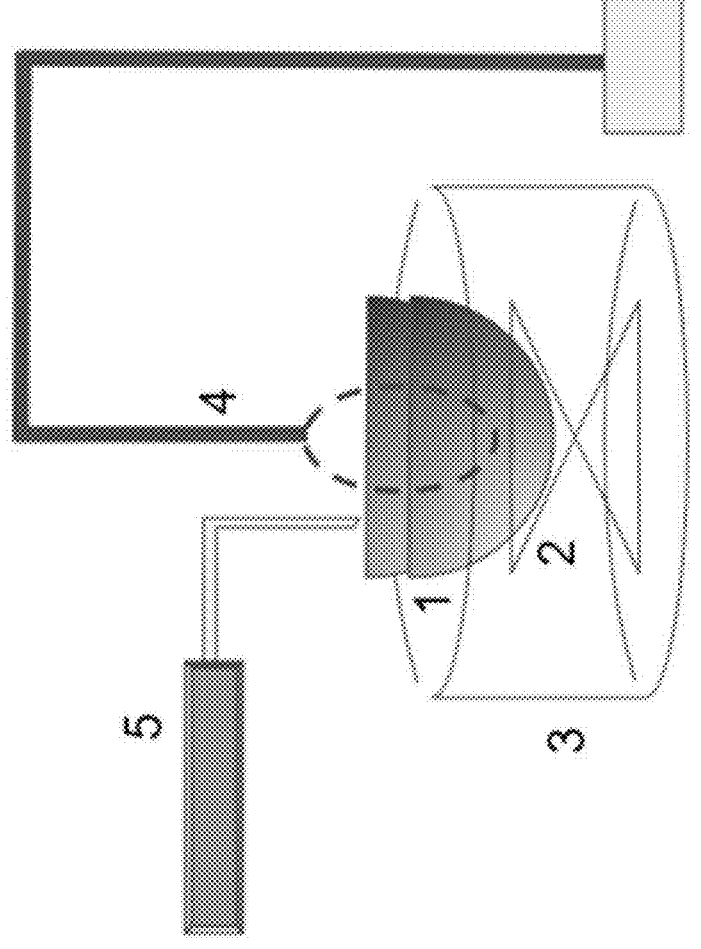
FIG. 4 is a schematic of a LB bench top method and mechanism with (1) inner and outer bowl stacking, (2) wire hold, (3) wide mouth basin for water collection, (4) clamp to hold coating object where the object is denoted with a dotted line, and (5) a syringe pump in accordance with an exemplary embodiment.

This choice of $R_0$ such that $R'(z_0)=0$ (Eq. 7) is illustrated in FIGS. 1A and 1B but is not necessary. Alternatively, a basin geometric curve for a sphere with larger, fixed $R_0$ is possible. In this case, there remains additional material in the apparatus after the 3D object is coated. In FIGS. 2A-2C, a 3-D printed basin is shown that is open at its bottom and resting on a separate funnel and flow-control valve system. A few objects and curves for $R'(z)$ and $r(z)$ as well as the equation-rendered 3D drawings are shown in FIGS. 3A-3D. Demonstration of the Concept Two (2) 5-cm radius hemisphere bowls are printed with 1.75-mm radius PLA filament on a Creality 3D printer. The bowls represent the geometry in FIG. 3C. One bowl has a 1-mm diameter hole centered at the bottom. The bowl with the hole can be stacked inside an intact bowl as shown in FIG. 4. The stack is subsequently placed on a wire stand so that the stack and wire stand can be suspended above a wide mouth basin. The object to be coated can be cleaned with a sonicator in water and ethanol. A clamp holds the object from above, suspending it slightly above the bottom of the inner bowl to ensure the bottom of the object would be coated, and the draining of the bowl would not be blocked.

Figures 5A, 5B, 5C, 5D:
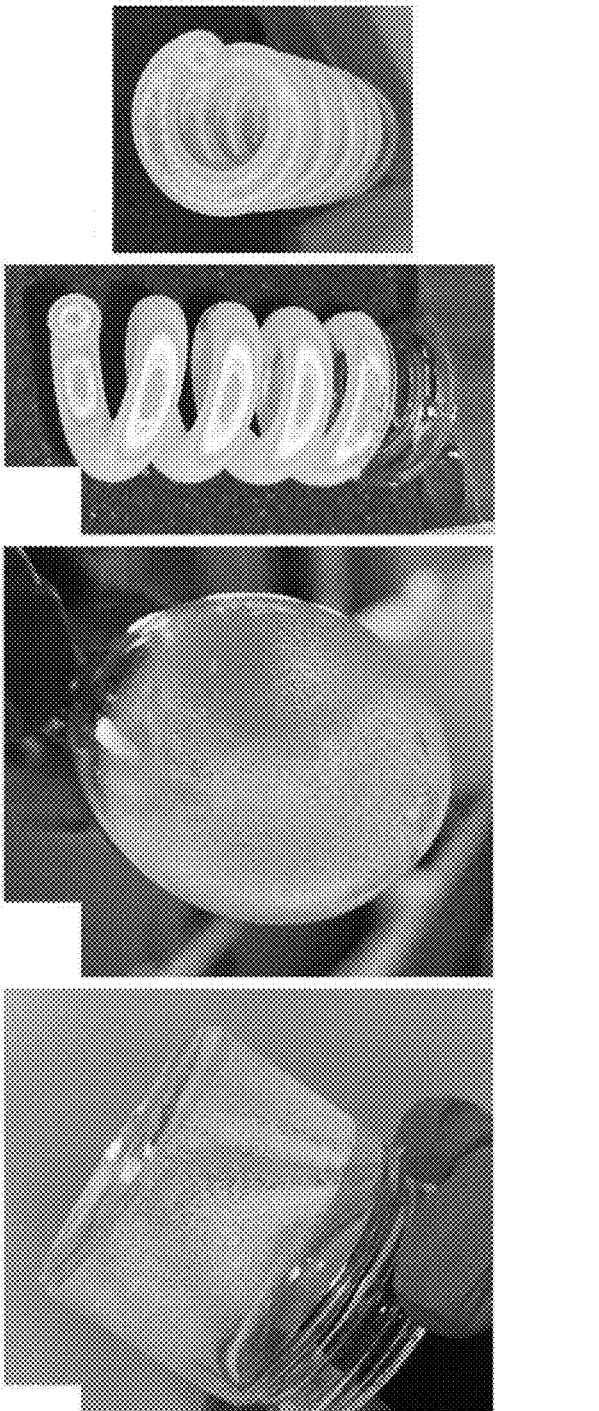
Figure 6:
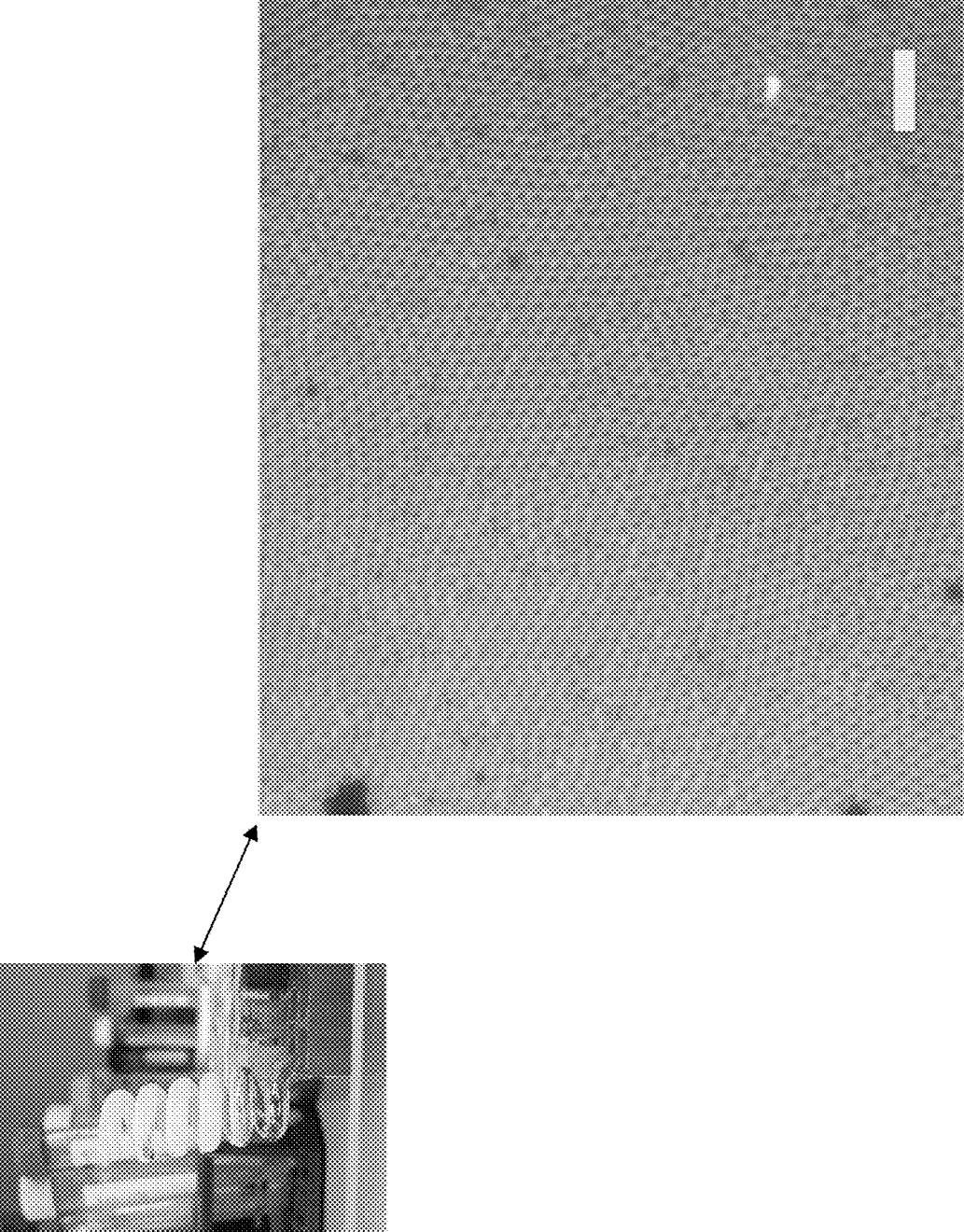
FIG. 6 is a microscope image of the 2-μm diameter PS film that coats an outer edge of the compressor tube (box, left), and a high degree of order and monolayer packing of the film is shown. Scale bar: 10 μm.

The inner bowl was filled with water, submerging the object. The outer bowl held the water dripping from the inner bowl long enough for the PS layer (5 wt %2-μm PS in 1:1 ethanol, water) to be deposited on the water's surface via a syringe pump. As the water dripped out of the hole in the inner bowl, the water weight on the outer bowl increased until it was large enough to push through the walls of the plastic and drip into the basin. This allowed for slow and consistent draining the inner bowl. Inside the inner bowl, the PS layer attached to the hydrophilic glass, following the water meniscus, while repelling against the hydrophobic walls of the bowl. As the water level slowly decreases, and more PS deposits onto the object, the circumference of the wall decreases, compressing the remaining PS. Using the meniscus of water, the PS is able to coat the variable surfaces of the objects, with excellent coverage of the underside. In accordance with an embodiment, a glass jar, bulb, and compressor tube were coated as shown in FIGS. 5A-6.

In accordance with an exemplary embodiment, an inexpensive approach to free-form object coating with LB films that can be implemented with a drainage basin instead of motorized compression barriers. The drainage basin can be 3D printed with equation-based computer-aided design.

The detailed description above describes embodiments of methods of 3D free-form printing strategies for coating arbitrary free-form objects. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:
1. A method of three-dimensional (3D) free-form printing for coating free-form objects, the method comprising:
  arranging a free-form object in a Langmuir-Blodgett (LB) trough filled with a liquid, the LB trough designed based on a shape of the free-form object;
  arranging an LB film comprising a plurality of colloidal particles on a surface of the liquid within the LB trough, and wherein a size of the plurality of colloidal particles includes nanoparticles and/or microparticles; and
  draining the liquid from the LB trough to form a self-assemble film of the colloidal particles on a surface of the free-form object through a drip below the free-form object and on a bottom of the LB trough.
2. The method according to claim 1, further comprising:
  draining the LB trough through the drip, which is centered in the bottom of the LB trough.
3. The method according to claim 1, wherein the LB trough is a drainage basin having a radius $R'(z)=r(z)+R(z)$, wherein $r(z)$ is a radius of an outer surface of the free-form object to be coated and $R(z)$ is a radial distance between the outer surface of the free-form object to be coated and an inner surface of the drainage basin, and wherein the radial distance between the outer surface of the free-form object and the inner surface of the drainage basin continuously decreases towards the bottom of the LB trough.
4. The method according to claim 3, wherein the drainage basin is designed so that a change in a surface area of the LB film is a change in a surface area of the self-assembled film, and wherein if $r(z)$ is the radius of the object as a function of z, and wherein the surface area of the coating at z for thickness dz is a change in an area of the LB film in the drainage basin as follows:

$$\frac{dSA(z)}{dz} = 2\pi r(z).$$

5. The method according to claim 4, wherein,
  if $R(z)$ is the inner radius of the drainage basin as a function of z, then the area of the film layer at a location z is:

$$A(z) = \pi[r(z) + R(z)]^2 - \pi[r(z)]^2;$$

the change in the surface area of the object is the derivative of:

$$\frac{d[A(z)]}{dz} = 2\pi[r(z) + R(z)]\left[\frac{dr}{dz} + \frac{dR}{dz}\right] - 2\pi r(z)\frac{dr}{dz};$$

wherein the change in object surface area would be equal to the negative change in drainage area, wherein $R'=r+R$, and $$-r(z)\left(1 - \frac{dr}{dz}\right) = R'(z)\frac{dR'}{dz};$$

and if one integrates both sides $$-\int r(z)dz + \frac{r(z)^2}{2} = \frac{R'(z)^2}{2} + C;$$

then one will have the condition that $R_0 = R(z=0)$, which yields the following:

$$R'(z) = \sqrt{R_0^2 - 2\int_0^z r(z')dz' + r(z)^2}$$

and if the colloid solution is minimized in a no-waste scenario, and wherein for the free-form object of length $z_0$, $R'(z_0)=0$, and $$R_0 = \sqrt{2\int_0^{z_0} r(z)dz}.$$

6. The method according to claim 1, wherein the plurality of colloidal particles are colloidal nanospheres, and the method further comprising:
   coating the free-form object with a monolayer of colloidal nanospheres.

7. The method according to claim 6, wherein the monolayer of colloidal nanospheres are carboxylic acid group (—COOH) modified polystyrene nanospheres.

8. The method according to claim 7, further comprising:
   placing the carboxylic acid group modified polystyrene nanospheres at an interface of air and the liquid with a syringe.

9. The method according to claim 8, further comprising:
   performing the placing of the carboxylic acid group modified polystyrene nanospheres at a rate of 0.1 ml/min to 0.3 ml/min.

10. The method according to claim 7, further comprising:
   coating the polystyrene nanospheres on one or more of glass, silicon wafer, indium tin oxide coated substrate, quartz, polyethylene terephthalate (PET) and polydimethylsiloxane (PDMS).

11. The method according to claim 1, wherein the plurality of colloidal particles comprises a plurality of spheres.

12. The method according to claim 1, wherein the liquid is a mixture of water/ethanol in a 1:1 volume ratio.

13. The method according to claim 1, wherein the colloidal particles are hydrophilic particles, and the liquid includes butanol.

14. The method according to claim 13, wherein the hydrophilic particles are selected from one or more of silica nanoparticles, gold nanoparticles, and silver nanoparticles.

15. The method according to claim 1, wherein the plurality of colloidal particles are colloidal nanospheres.

* * * * *